(12) United States Patent
Alioto et al.

(10) Patent No.: US 6,768,421 B1
(45) Date of Patent: Jul. 27, 2004

(54) CONTAINER CRANE RADIATION DETECTION SYSTEMS AND METHODS

(75) Inventors: John I. Alioto, San Francisco, CA (US); Matthew T. Alioto, San Francisco, CA (US)

(73) Assignee: VeriTainer Corporation, St. Helena, CA (US)

( * ) Notice: Subject to any disclaimer, the term of this patent is extended or adjusted under 35 U.S.C. 154(b) by 0 days.

(21) Appl. No.: 10/356,154

(22) Filed: Jan. 31, 2003

(51) Int. Cl.$^7$ .............................................. G08B 17/12

(52) U.S. Cl. ........................ 340/600; 340/603; 378/57; 378/62

(58) Field of Search ..................... 340/854.1, 854.6, 340/856.3, 600, 603; 250/363.01, 363.02, 369, 392, 395, 559.38; 378/57, 62, 69; 75/10.12, 384, 386

(56) References Cited

U.S. PATENT DOCUMENTS

| | | |
|---|---|---|
| 3,543,952 A | 12/1970 | Young |
| 3,559,822 A | 2/1971 | Lichtenford |
| 3,630,390 A | 12/1971 | Tax |
| 3,812,987 A | 5/1974 | Watatani |
| 3,881,608 A | 5/1975 | Huekes |
| 3,921,818 A | 11/1975 | Yamagishi |
| 4,244,615 A | 1/1981 | Brown |
| 5,098,640 A | 3/1992 | Gozani |
| 5,638,420 A | 6/1997 | Armistead |
| 5,838,759 A | 11/1998 | Armistead |
| 5,948,137 A * | 9/1999 | Pflaum ...................... 75/10.12 |
| 6,058,158 A | 5/2000 | Eiler |
| 6,115,128 A * | 9/2000 | Vann ........................... 356/375 |
| 6,234,332 B1 | 5/2001 | Monzen |
| 6,301,326 B2 | 10/2001 | Bjorkholm |
| 6,370,222 B1 | 4/2002 | Cornick |
| 6,448,564 B1 | 9/2002 | Johnson |
| 6,459,761 B1 | 10/2002 | Grodzins et al. |
| 6,495,837 B2 | 12/2002 | Odom |

OTHER PUBLICATIONS

Motley, "Detect, not detonate," American Shipper, vol. 45, No. 1, Jan. 2003, pp. 59–61.
Tirschwell, "Watching for nukes," The Journal of Commerce, vol. 4, Issue 2, Jan. 13, 2003, pp. 22–23.
Rad/Comm Systems Corp., Sensitive, Proven, and Reliable Radiation Detection Systems for Port Security, 2003.
Rad/Comm Systems Corp., "Complete Line of Radiation Detection Systems for Port Security Applications," Feb. 5, 2003.
Rad/Comm Systems Corp., http://www.radcomsystems.com/, Feb. 5, 2003.
Canberra Industries, Product Catalog, 12th Ed.
Canberra Industries, "Canberra Homeland Security Products," http://www.canberra.com/homeland.htm/, Dec. 30, 2002.
Canberra Industries, "Syren, Radiological Monitoring Systems for Access Control".

(List continued on next page.)

Primary Examiner—Van Trieu
(74) Attorney, Agent, or Firm—A. T. Cascio

(57) ABSTRACT

A container crane assembly is operable to lift shipping containers for transfer between a dock and a ship transporting the containers. Typically, the container crane includes a hoist attachment which engages the shipping container. A fissile or radioactive material detection device may be mounted to the hoist attachment such that as the shipping container is being engaged, the detection device is brought into proximity to the container so that the presence of fissile or radioactive material, or shielding materials to conceal the presence of such fissile or radioactive materials, may be detected prior to the shipping container being loaded onto or unloaded from a shipping vessel. A comparison may then be made of the output of the detector to a threshold to determine subsequent action regarding the shipping container.

58 Claims, 6 Drawing Sheets

OTHER PUBLICATIONS

Canberra Industries, "Neutron Detection and Counting," http://www.canberra.com/literature/basic_principles/neutron.htm, Jan. 8, 2003.

Amptek, Inc., Uranium and Plutonium Detection, http://www.amptek.com/uranium.html, Jan. 27, 2003.

Klett, "Plutonium Detection With a New Fission Neutron Survey Meter," IEEE.

Transactions on Nuclear Science, vol. 46, No. 4, Aug. 1999, pp. 877–879.

Canberra Industries, "Standard Electrode Coaxial Ge Detectors," Apr. 2002.

Maher, "DEXA: Radiation Safety: Scintillation Counters, "http://www.bh.rmit.edu.au/mrs/DigitalRadiography/DRPapers/DXEA_ScintDetectors.html, Jan. 10, 2003.

Bello, "Purchase, Operation and Maintenance of a Container Crane Spreader," Port Technology International.

Sublette, "Alexander Lebed and Suitcase Nukes," http://nuketesting.enviroweb.org/hew/News/Lebedbomb.html, Jan. 9, 2003.

Newsmax.com, "Russian General Lebed Warned of Suitcase Nukes, Dies In Crash," http://www.newsmax.com/showinside.shtml?a=2002/428/221930, Jan. 9, 2003.

American Science and Engineering, Inc., "American Science and Engineering, Inc. Receives Order for Radioactive Threat Detection Upgrade to Mobile Search X–ray Inspection System from Hong Kong Customs," Dec. 19, 2002, http://biz.yahoo.com/bw/021219/192345_1.html, Jan. 13, 2003.

Canberra Industries, "Gamma and X–ray Detection," http://www.canberra.com/literature/basic_principles/gamma.htm, Jan. 8, 2003.

Canberra Industries, "A practical Guide to High Count Rate Germanium Gamma Spectroscopy," http://www.camberra.com/literature/technical_ref/gamma/nan0013.htm, Jan. 8, 2003.

Canberra Industries, "Coaxial Germanium Detectors," Jan. 8, 2003.

Associated Press, "Rule Requires U.S.–Bound Cargo Details," Jan. 10, 2003.

* cited by examiner

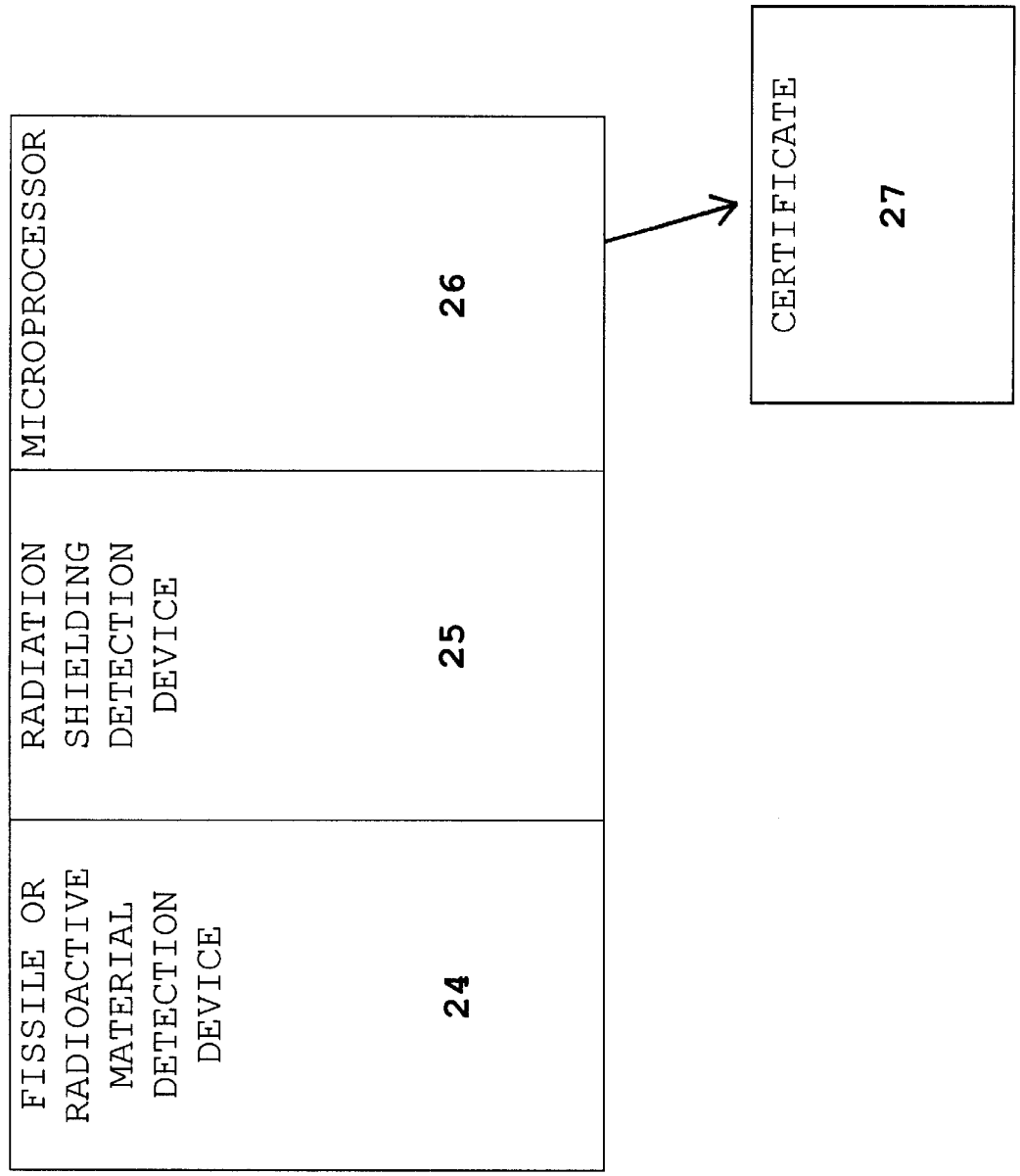

CONTAINER CRANE RADIATION DETECTION SYSTEMS AND METHODS

BACKGROUND OF THE INVENTION

1. Field of the Invention

The present invention is directed to the detection of fissile or radioactive material or to shielding material to conceal such fissile or radioactive material, and more particularly to a container crane having thereon one or more detectors to detect the presence of such fissile or radioactive or shielding materials.

2. Background of the Art

On Sep. 11, 2001, the United States was attacked by a terrorist network named al Qaeda. The al Qaeda terrorists hijacked four commercial airliners to launch a massive attack. The terrorists flew a hijacked airliner into each of the two towers of the World Trade Center in New York City and one into the Pentagon in Washington, D.C., the military headquarters of our country. The efforts of courageous airline passengers and crew foiled the attempt to fly the fourth hijacked airliner into an additional target, most likely in the Washington, D.C. area, by causing it to crash into the Pennsylvania countryside. In all, over 3,000 people were killed on American soil on the morning of Sep. 11, 2001.

The September 11 attacks were a wake-up call for America. Americans suddenly realized that our free and open society was vulnerable to terrorist attack in many ways. Everywhere, Americans saw vulnerabilities, especially to "weapons of mass destruction" such as nuclear weapons. A nuclear weapon is a device, such as a bomb or warhead, whose great explosive power derives from the release of nuclear energy. Nuclear weapons include so-called "dirty bombs." A dirty bomb is a conventional explosive device packed with radioactive material to spread radioactive contamination that causes sickness in human beings. Radiation sickness is illness induced by exposure to ionizing radiation, ranging in severity from nausea, vomiting, headache, and diarrhea to loss of hair and teeth, reduction in red and white blood cell counts, extensive hemorrhaging, sterility, and death.

Vulnerability to harm from nuclear weapons caused by terrorists requires that the nuclear weapon be delivered to and detonated in the target area. For example, a nuclear weapon can be delivered and detonated on American soil by bringing the weapon into the country by stealth. One way of bringing a nuclear weapon into the country by stealth is to hide it in one of the tens of thousands of shipping containers that are brought into the United States every day.

It is a purpose of this invention to prevent the transportation of nuclear weapons by stealth in shipping containers into and out of ports anywhere in the world, in general, and into and out of ports in the United States, in particular. It is also a purpose of this invention to prevent nuclear weapons from being imported into the United States by stealth in shipping containers that are (1) loaded in foreign ports; (2) transported to the United States by ships, including huge ocean-going container ships that carry upwards of 4,000 twenty-foot-equivalent ("TEUs") shipping containers; and, (3) unloaded in, or brought into close proximity to, ports or population centers in the United States. Using this invention, terrorists can be prevented from attacking the United States, or any other nation or population, with nuclear weapons brought into proximity to population centers by stealth in a shipping container.

a. Detection Systems

It is known in the art of nuclear weapon detection technology that nuclear weapons which use uranium emit detectable gamma rays. Given the periodic table symbol "U," uranium is a heavy silvery-white metallic element, radioactive and toxic, easily oxidized, and having 14 known isotopes of which U 238 is the most abundant in nature. The element occurs in several minerals, including uraninite and carnotite, from which it is extracted and processed for use. It has an atomic number 92; atomic weight 238.03; melting point 1,132° C.; boiling point 3,818° C.; specific gravity 18.95; valence 2, 3, 4, 5, 6. Uranium is enriched in a process whereby the amount of one or more radioactive isotopes in the material is increased.

It is known in the art of nuclear weapon detection technology that nuclear weapons which use plutonium emit detectable gamma rays and detectable neutrons. Given the periodic table symbol "Pu," plutonium is a naturally radioactive, silvery, metallic transuranic element, occurring in uranium ores and produced artificially by neutron bombardment of uranium. Its longest-lived isotope is Pu 244 with a half-life of 76 million years. It is a radiological poison, specifically absorbed by bone marrow, and is used, especially the highly fissionable isotope Pu 239, as a reactor fuel and in nuclear weapons. It has an atomic number 94; melting point 640° C.; boiling point 3,235° C.; specific gravity 19.84; valence 3, 4, 5, 6.

Since the 1911 work of Hans Geiger, it has been know that devices can detect the presence of ionizing radiation. Named the Geiger-Müller counter, an improved version of the device detects alpha particles, electrons and ionizing electromagnetic photons. Modernly, plastic scintillation is used to detect both gamma and neutron radiation. For example, Canberra Industries, Inc. of Meriden, Conn. (www.canberra.com) manufactures and markets monitors that use scintillation detectors designed for the radiological control of pedestrian vehicles, trucks and rail cars. There are other devices commercially available that can be used to detect radiation, including those that use both scintillating and non-scintillating materials. In this description and the appended claims, all of these devices will be referred to as "fissile or radioactive material detection device(s)."

It is known in the art of nuclear weapon detection technology that the presence of uranium or plutonium based nuclear weapons can be concealed by covering the weapon with radiation shielding material such as lead. Given the periodic table symbol "Pb," lead is a soft, malleable, ductile, bluish-white, dense metallic element, extracted chiefly from galena and used in containers and pipes for corrosives, solder and type metal, bullets, radiation shielding, paints, and antiknock compounds. It has an atomic number 82; atomic weight 207.2; melting point 327.5° C.; boiling point 1,744° C.; specific gravity 11.35; valence 2, 4. A nuclear weapon could be placed in a shipping container and then covered with a layer of radiation shielding material, typically lead of one to two inches or more in thickness. In this way, the fissile or radioactive material detection device or devices of the shipping container crane of the present invention may not be capable of identifying the presence of the nuclear weapon. Thus, radiation shielding material can be used to deliver and detonate a nuclear weapon on American soil by bringing the weapon into the country by stealth in a shipping container.

Other shielding materials are also known in the art. For example, high density concrete is typically used to contain radioactive emission in structures. The thickness of high density concrete to shield a nuclear weapon placed in a shipping container could be in the same order of magnitude as the thickness of lead required in the above example.

There are two major limitations on the use of radiation shielding material to shield the radiation emanating from a nuclear device hidden in a shipping container: (1) the ability of an x-ray or other detection system to detect the presence of an amount of radiation shielding material necessary to shield the radiation emanating from the nuclear device; and, (2) the maximum amount of weight of the shipping container permitted by various state and federal regulations in the United States in order that the container be truly intermodal (the so-called "over-the-road" weight limitation). First, x-ray or other detection system inspection of shipping containers to attempt to discern the presence of radiation shielding material is well known in the art. For example, some of these inspection systems typically produce a transmission image by the measurement of the intensity distribution of the x-rays that transverse the shipping container. Thus, radiation shielding material used to cover a nuclear weapon can be detected by the use of such x-ray or other detection systems. In this description and the appended claims, all of these devices will be referred to as "radiation shielding detection device(s)."

Second, the general "over-the road" weight limitation for North America is a gross weight per vehicle (tractor, chassis, container and cargo) of 80,000 lbs. or 36,288 kgs. for a forty-foot or forty-five-foot container and 68,000 lbs. or 30,845 kgs. for a twenty-foot container. Thus, there is a limit to the amount of heavy, radiation shielding material that can be loaded in a shipping container without attracting attention. A large amount of radiation shielding material used to cover a nuclear weapon can exceed the over-the-road weight limitation for the cargo. Where the combined weight of the nuclear weapon and the radiation shielding material (which covers the nuclear weapon) exceed these weight limitations, there is a high probability that the container will either be physically inspected (i.e., opened, entered and viewed by a person) or refused carriage.

b. Shipping Containers Systems Or Containerization

Since the late 1960's, the use of shipping containers for ocean-going transportation or containerization has been prevalent. The shipping container has significant advantages over the old, so-called "break bulk" system of lashing and shoring of cargo in the cargo holds of "tween deck" vessels or any other type of break bulk system, e.g., LASH barges. Containerization makes intermodal transportation a reality. Once cargo is loaded into a container at its origin (usually by its manufacturer or seller), containerization makes possible the transportation of the container by truck, rail and ship, over land and sea, to its destination without disturbing its contents. Containerization creates greater speed of transportation while, at the same time, less expensive handling, damage and theft.

As with all ocean going freight systems, in containerization, the port or ports of loading and unloading (embarkation and disembarkation) constitute major bottlenecks. At the load port, the full container is taken into the container yard. There, its alphanumeric identification number is recorded for tracking and location purposes. At or before this time, the cargo in the container is recorded for inclusion on the ship's manifest (the "manifest"). The full container is then stored, usually in an open yard, to await loading aboard the containership. During this period of storage, the full container can be inspected. However, inspection in the container yard requires that an additional step or function take place, namely, additional handling by additional personnel.

Similarly, at the load port, the partially loaded container is taken into the container yard. There, its alphanumeric identification number is recorded for tracking and location purposes. Prior to storage in the container yard, the cargo in the partially loaded container may be consolidated either in the same container or in another container with other cargo. At or before this time, the cargo in the container is recorded for inclusion on the manifest. Thereafter, the container is stored in the container yard to await loading aboard the containership. Similarly, during this period of storage, the container can be inspected. However, once again, inspection in the container yard requires that an additional step or function take place, namely, additional handling by additional personnel.

Tens of thousands of containers are loaded and unloaded in the ports of the world every day. However, only a very small percentage of these containers is inspected. It is said that of the some 21,000 containers unloaded in the ports of the United States every day, less than 3% are inspected. This situation represents a major vulnerability to terrorism and other unlawful conduct due to the possibility of concealment of nuclear weapons. Accordingly, a need exists in the art to mitigate the possibility of an attack on the United States, or any other nation or population, with nuclear weapons brought into proximity to population centers by stealth in a shipping container.

SUMMARY OF THE INVENTION

According to the present invention, either or both a fissile or radioactive material detection device and a radiation shielding detection device is placed on the container crane that is used to load and unload a container ship. These container cranes are usually located on the shoreside or top wharfage of the container yard where containers are loaded and unloaded. Sometimes, there are container cranes located aboard the containership itself. All of these container cranes utilize a device known as a spreader, yoke or grabber, but more particularly described as a hoist attachment. In this description and the appended claims, the words "spreader," "yoke," "grabber" and "hoist attachment" are synonymous and refer to that part of the container crane used to load and unload container ships that is physically attached to the hoist mechanism and, during loading and unloading operations, also physically attached to the container. The hoist attachment is attached to the container by virtue of male pieces, sometimes called "twist locks," on the hoist attachment and female pieces at the corners of the container, sometimes called "corner castings."

A shoreside container crane sits on the top wharfage in an "A" frame or rectangular box frame structure. The crane has four stanchions or vertical supports that are usually on rails. The crane travels fore and aft on the top wharfage alongside the ship in order to load or unload containers from any hold or longitudinal section of the ship. The crane also has a horizontal boom-like girder held in place by suspension cables. Typically, girders extend and retract on a hinge or they may telescope (slide inward and outward in overlapping sections). In a loading operation, traveling to and fro along the girder by virtue of a carriage or trolley, the hoist mechanism and hoist attachment extend out from the top wharfage over the ship.

The hoist attachment is a rectangularly shaped structure consisting of steel beams with male pieces or "twist locks" at the four corners. The male pieces lock into the corner casting female pieces located at the corners of a container. The hoist attachment is the interface between the hoist mechanism of the container crane and the container. During loading or unloading, the hoist attachment is physically attached to the hoist mechanism and the container. It is the only part of the container crane that touches the container. The hoist attachment can retract or expand to accommodate twenty-foot, forty-foot or forty-five-foot containers. In this description and the appended claims, the words "spreader," "yoke," "grabber" and "hoist attachment" are synonymous.

For example, during loading, the hoist attachment is attached to a container. The hoist mechanism then shifts the hoist attachment and attached container upwardly from the top wharfage or from vehicles on the top wharfage or from an interim stage located on the container crane itself. Once at the desired height above the side of the ship to be loaded, the hoist mechanism and hoist attachment with attached container travel outwardly athwartships (across the ship from side to side) and stop above the appropriate container cell on the ship. The hoist mechanism then lowers the hoist attachment with attached container into the hold or onto the deck of the ship to the designated location for the particular container. Once the container is in place, the hoist attachment separates from the container and is lifted upwardly by the hoist mechanism whence it is returned to a location above the top wharfage to load another container. During unloading, the reverse occurs: the hoist mechanism lifts the hoist attachment and attached container out of the hold or off the deck of the ship and places the container on the top wharfage, a vehicle on the top wharfage or an interim stage located on the container crane itself.

For so-called "self contained ships" or ships equipped with their own container crane or cranes, the structures and operations are similar. The shipboard crane sits on the ship's deck as a rectangular box frame structure. The crane has four stanchions or vertical supports that are connected by beams, straddle the ship's holds and are usually on rails. The crane travels fore and aft on the ship's deck in order to load or unload containers from any hold or deck section of the ship. The crane also has a horizontal boom-like girder. The girder telescopes (slides inward or outward in overlapping sections) and extends and retracts. In a loading operation, traveling to and fro along the girder, the hoist mechanism and hoist attachment extend out from the ship over the top wharfage. The hoist mechanism lowers the hoist attachment which then attaches to the container. Once, attached, the hoist mechanism lifts the hoist attachment and attached container upwardly to an appropriate height over the side of the ship, travels inwardly athwartships (across the ship from side to side) and stops above the appropriate container cell or deck location on the ship. The hoist mechanism then lowers the hoist attachment and attached container into the hold or on to the deck of the ship to the designated location for the particular container.

The structures and functions described above for shoreside and shipboard cranes exist and occur identically when the water vehicle is a barge rather than a ship. In this description and the appended claims, the words "container crane" mean a container crane whether operated on shore or aboard a waterborne vehicle (a ship or a barge).

There are some shore side container cranes that load the container in more than one stage. In a two stage container crane, there are additional, rearward (the part of the crane that is the farthest from the ship) stanchions. These stanchions create an additional hoisting area at the rear of the crane (the part of the crane that is farthest from the ship). In the additional hoisting area, an additional hoist mechanism and hoist attachment are employed. The additional hoist mechanism and hoist attachment lift the container to a platform located on the container crane itself. Thereafter, the hoist mechanism and hoist attachment at the front of the crane (the part of the crane that is closest to the ship) take the container from this platform and load it aboard the ship in the manner previously described. There are also container cranes that handle more than one container at a time. In this description and the appended claims, the words "container crane" mean a container crane whether it has an additional hoisting area, hoist mechanism or hoist attachment or handles more than one container at a time.

It is the invention of the systems and methods described herein to make and use container cranes of which fissile or radioactive material detection devices and/or radiation shielding detection devices are a part. The fissile or radioactive material and radiation shielding detection devices located on the container crane (preferably on the hoist attachment) will inspect the container just before, during or just after the time that the hoist attachment of the container crane is attached to the container and while loading or unloading the ship. The fissile or radioactive material detection devices and radiation shielding detection devices may further be equipped with a microprocessor which will receive, process (e.g., compare) and communicate a record of the levels of radiation or extent of radiation shielding material present in the container.

With this system and method, a shipping or stevedoring company can check the level of radiation or radiation shielding material present in virtually every container that the company loads onto or unloads from virtually every ship or barge it operates or stevedores. After the microprocessor records the levels of radiation or extent of radiation shielding material present in the container, this information can be communicated (on a wire or wirelessly) to the operator of the crane, the operations office in the container yard and, through a computer at the dockside, to the headquarter office of the company or any governmental agency or authority. Among other things, the shipping or stevedoring company can use the information about the levels of radiation or extent of radiation shielding material present in the container to decide whether the particular container should continue to be loaded or unloaded or, rather, should be subject to further detection techniques, including physical inspection.

BRIEF DESCRIPTION OF THE DRAWINGS

FIG. 6 is a diagram of the fissile or radioactive material detection devices, radiation shielding detection devices and microprocessors located in housing on the container crane, preferably on the hoist attachment, according to the principles of the present invention.

DESCRIPTION OF THE EXEMPLARY PREFERRED EMBODIMENTS

Figure 1:
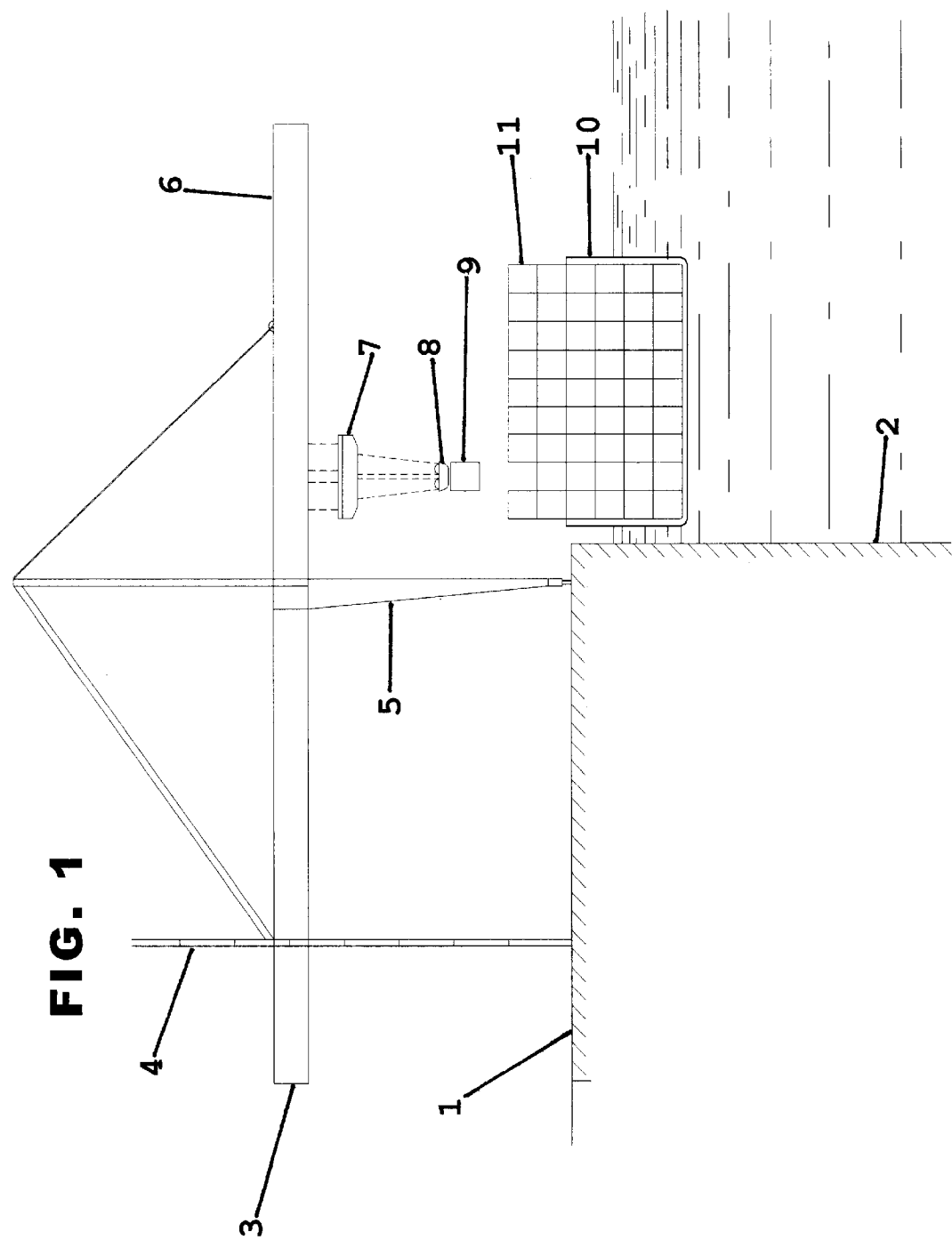
FIG. 1 is a side view of wharfage, a container crane assembly and a vessel.

Referring now to FIG. 1, the typical operation of loading and/or unloading a containership 10 with a container crane 3 is described. In the typical operation of loading or unloading containers, the containership 10 is docked at the side wharfage 2. The container crane 3 sits on the top wharfage 1. The container crane 3 has four stanchions of which two stanchions 4 and 5 are shown in FIG. 1 (there are two other stanchions not shown in FIG. 1). A girder 6 carries the hoist mechanism 7, hoist attachment 8 and container 9 out over the containership 10 to be placed or taken from its place among the other containers 11 aboard the containership 10.

Figure 2:
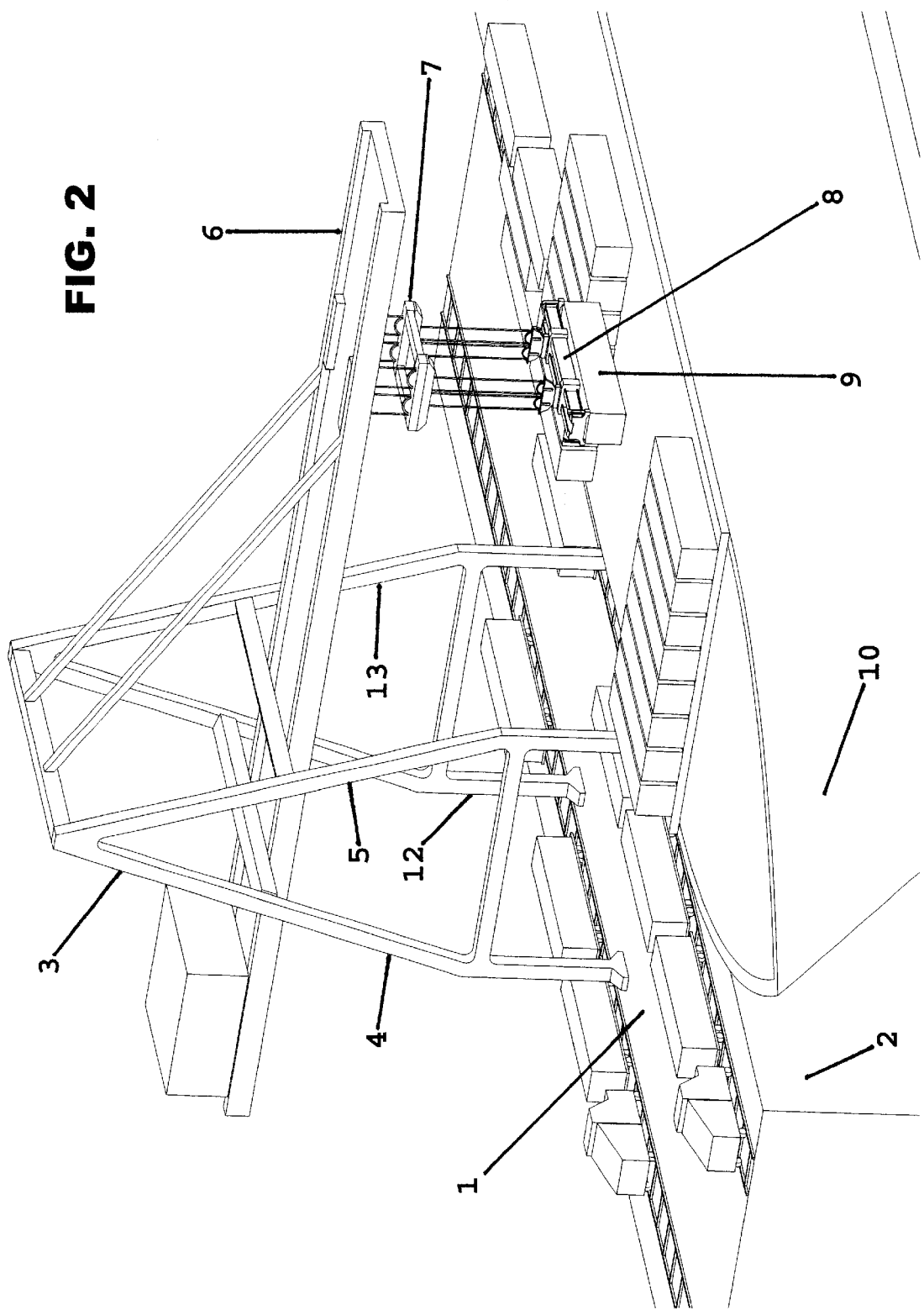
FIG. 2 is perspective view of a container crane assembly.

FIG. 2 shows a perspective view of the loading or unloading operation. From this perspective, stanchions 12 and 13 can be seen.

Figure 3:
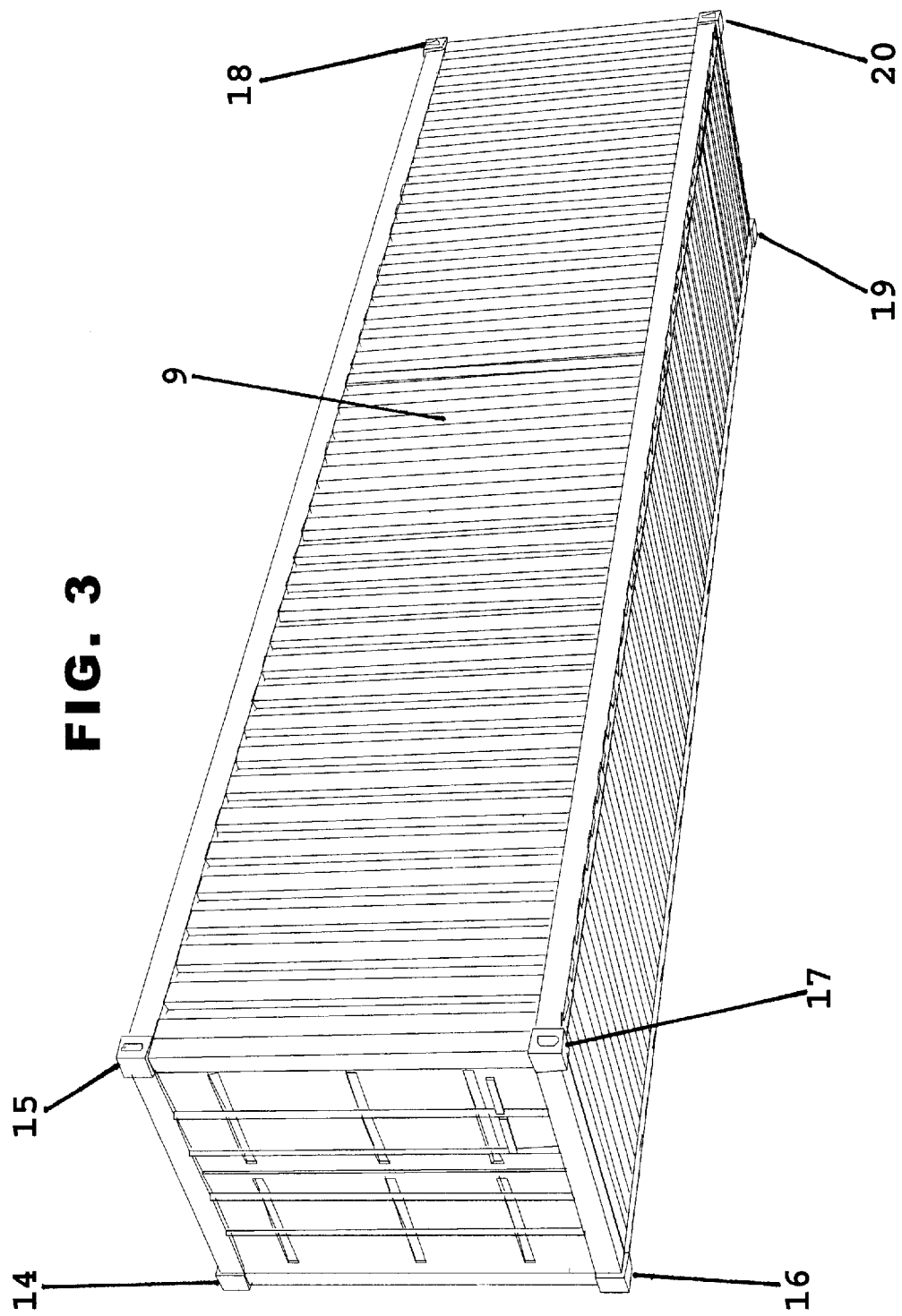
FIG. 3 is a perspective view of a container.

FIG. 3 shows a typical container 9 and seven of the eight female piece corner castings 14, 15, 16, 17, 18, 19 and 20.

Figure 4:
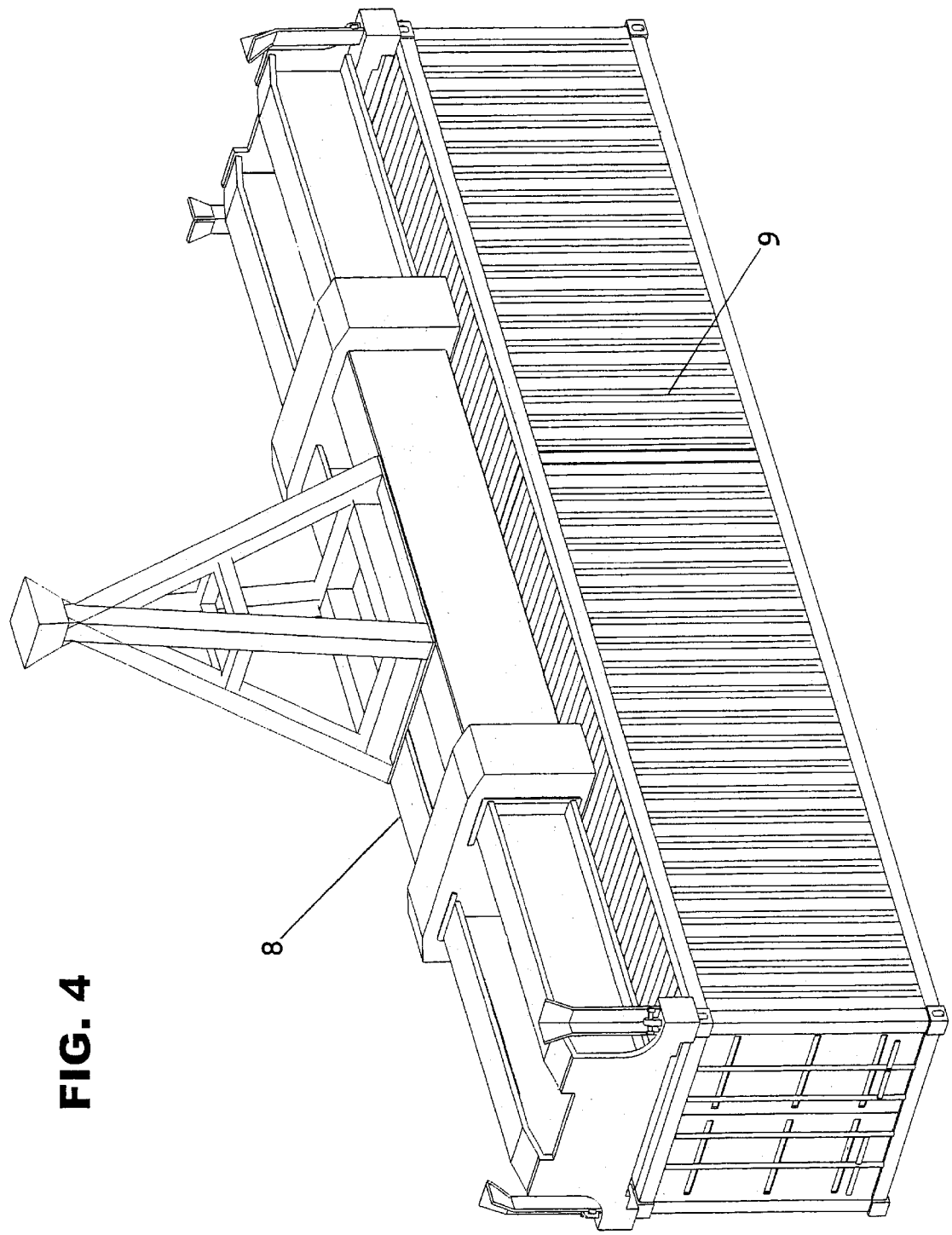
FIG. 4 is a perspective view of the container engaged by a hoist attachment.

FIG. 4 shows a typical hoist attachment 8 when it is attached to the container 9.

Figure 5:
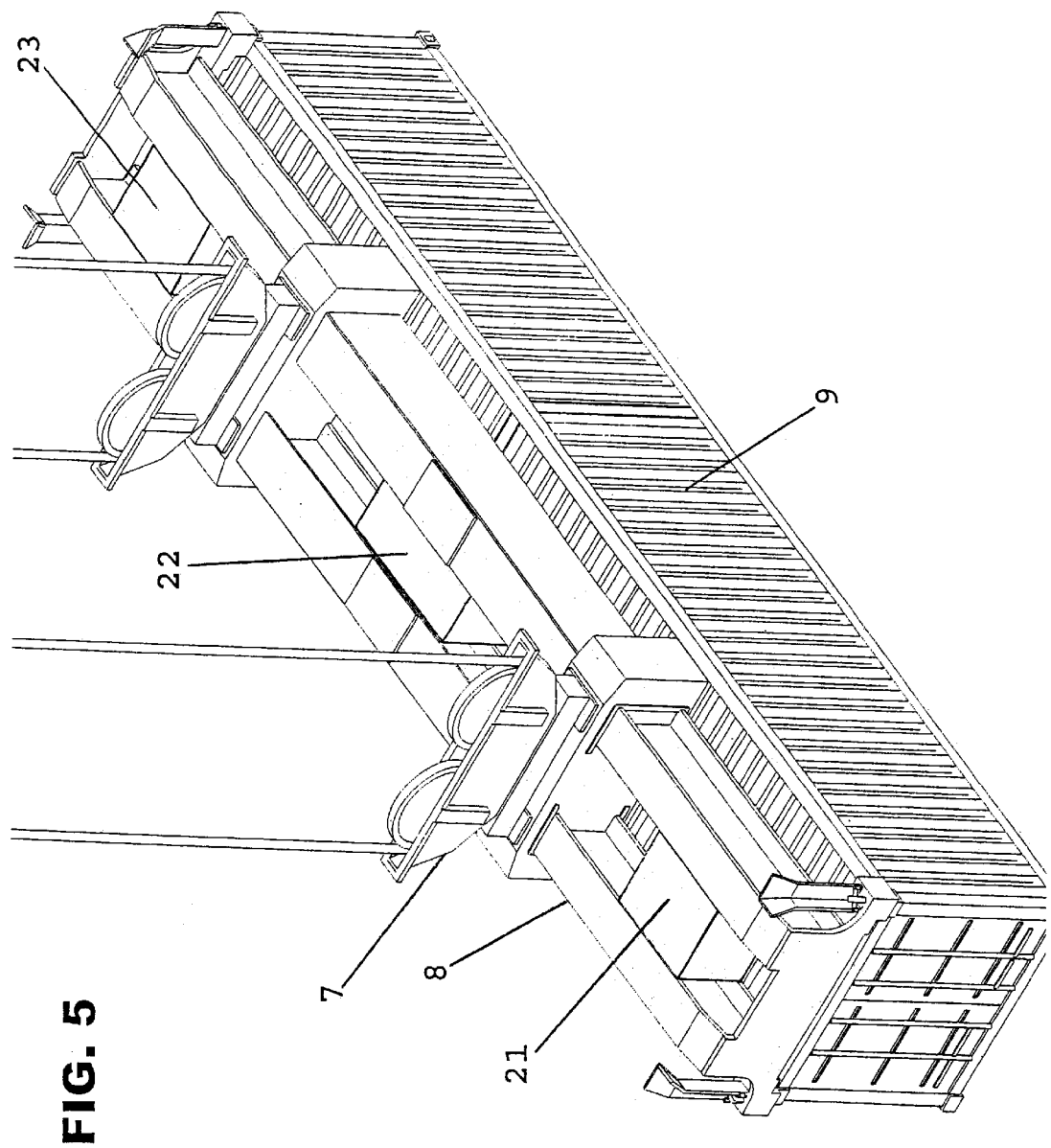
FIG. 5 is a perspective view of a hoist attachment constructed according to the principles of the present invention.

FIG. 5 is another perspective of the hoist mechanism 7 and hoist attachment 8 when the hoist attachment is attached to the container 9. From this perspective, the housings 21, 22 and 23 for the fissile or radioactive material detection devices, radiation shielding detection devices and microprocessor or PC 26 can be seen.

FIG. 6 is a diagram of one of the housings 21, 22 or 23 located on the hoist attachment 8 showing the fissile or radioactive material detection device 24, radiation shielding detection device 25 and microprocessor or PC 26. The fissile or radioactive material detection device 24, radiation shielding detection device 25 and microprocessor or PC 26 may be housed in one or more housings located on the container crane 3, preferably on the hoist attachment 8.

The best mode of carrying out the invention is to locate the fissile or radioactive material detection device 24, radiation shielding detection device 25 and microprocessor or PC 26 in housing 21, 22 and 23 on the hoist attachment 8 of the container crane 3. The fissile or radioactive material detection device 24 and radiation shielding detection device 25 can be off-the-shelf devices such as the systems sold by Canberra Industries, Inc. of Meriden, Conn. (www.canberra.com). The devices may further be suitably cushioned by hydraulic or electro-magnetic shock-absorbers or actuators. As well, the fissile or radioactive material detection device 24 and radiation shielding detection device 25 located in the housing 21, 22 and 23 on the hoist attachment 8 of the container crane 3 can be custom made for use on a container crane.

With both the fissile or radioactive material detection device 24 and radiation shielding detection device 25 located in the housing 21, 22 and 23 on the hoist attachment 8 of the container crane 3, a microprocessor or PC 26 may be employed. The microprocessor or PC 26 may be located in housing 21, 22 and 23 on the hoist attachment 8 of the container crane 3 or elsewhere. For example, the microprocessor or PC 26 may be located in the operations office of the container yard as long as it is in communication with the fissile or radioactive material detection device 24 and radiation shielding detection device 25. The microprocessor or PC 26 may further be deployed in conjunction with the fissile or radioactive material detection device 24 and radiation shielding detection device 25. Either wired or wireless communications technology can be used to communicate the results or output of the fissile or radioactive material detection device 24 and radiation shielding detection device 25 to the microprocessor or PC 26. The microprocessor or PC 26 may also be in communication with the shipping company's logistics computer system such that the alphanumeric identification number and manifest information of the container 9 is also communicated to the microprocessor or PC 26. The manifest information may then be used by the microprocessor or PC 26 to determine threshold levels of fissile or radioactive material or radiation shielding material expected to be emitted from the container 9.

The microprocessor or PC 26 is preferably programmed with a computer program that has tolerances or thresholds against which radiation and radiation shielding material inspection results can be compared. For example, radiation guidelines as set by the Nuclear Regulatory Commission (the "NRC") and other state and federal regulatory agencies establish maximum acceptable radiation levels for human safety. The NRC maximum level can be used as a radiation tolerance. The extent of radiation shielding material necessary to cover up the presence of a nuclear weapon can be used as a radiation shielding material tolerance.

The microprocessor or PC 26 may also be run with a computer program that has manifest information against which radiation and radiation shielding material inspection results can be compared. For example, the tolerance or threshold level of radiation may be dependent upon the contents of container 9. If known permissible radioactive materials are present in the container 9, the threshold may be set higher than for container loads for which the manifest does not list any known radioactive material. Furthermore, a plurality of detectors 24, 25 may be used to indicate that a spot source of radiation is present in the container 9 by comparing their respective outputs or obtaining differential output signals. Should the manifest indicate that the cargo load contains permissible radioactive material, but should be evenly distributed in the container 9, any differential output of the multiple detectors 24, 25 would indicate that a point source is present. Accordingly, a differential threshold may be established from the contents of the manifest.

In an example of the operation of the present invention, the level of radiation detected by the fissile or radioactive material detection devices 24 and 25 in housing 21, 22 and 23 on the hoist attachment 8 of the container crane 3 is communicated to the microprocessor or PC 26. The microprocessor or PC 26 then compares the radiation levels with the preset radiation tolerance or radiation levels expected to be experienced with the cargo in the container 9 as set forth on the manifest. If the radiation level is at or below the maximum tolerance or expected radiation levels, the computer program running on the microprocessor or PC 26 then compares the radiation shielding material level with the preset radiation shielding material tolerance or radiation shielding material levels expected to be experienced with the cargo in the container 9 as set forth on the manifest. If the radiation shielding material level is at or below the tolerance or expected radiation levels, the microprocessor or PC 26 can cause a certificate 27 to be printed which certificate 27 verifies that this particular container 9 (using its alphanumeric identification number) neither contains a nuclear weapon nor sufficient radiation shielding material to cover up a nuclear weapon. On the other hand, if either the radiation or radiation shielding material level exceeds tolerance or expected levels, this particular container 9 can be identified for a more invasive search, including physical inspection using the appropriate nuclear protocols, if necessary.

In the ordinary course of business, shipping companies and their agents will advise container shippers or consignors of the maximum radiation and radiation shielding material levels permitted to be in a container or expected from a given, manifested cargo. Vice versa, in the ordinary course of business, shippers or consignors will advise shipping companies of the levels of radiation and radiation shielding material to be expected in their containers. Legitimate shippers or consignors will advise the shipping company or agent that their particular container shipment will exceed these levels and need pre-loading inspection.

There has been described hereinabove novel apparatus and methods for detection of fissile or radioactive material and radiation shielding material within shipping containers. Those skilled in the art may now make numerous uses of, and departures from, the hereinabove described embodiments without departing from the inventive principles disclosed herein. Accordingly, the present invention is to be defined solely by the lawfully permissible scope of the appended Claims.

We claim:

1. A system to detect the presence of fissile or radioactive material in a shipping container comprising:
   a container crane assembly operable to lift said container; and
   a fissile or radioactive material detection device located on said container crane assembly operable to detect the presence of said material when proximal to said container; and
   a computer, said fissile or radioactive material detection device developing an output signal communicated to said computer, said computer in response to said output signal comparing said output signal to a predetermined threshold to determine a status of said container.

2. The system of claim 1 wherein said container crane assembly includes a hoist attachment to engage said container, said fissile or radioactive material detection device being mounted on said hoist attachment.

3. The system of claim 1 wherein said computer generates a certificate verifying that said container does not contain a quantity of said material greater than a predetermined maximum quantity in the event said output signal is less than said threshold.

4. The system of claim 1 wherein said computer develops an output signal indicative of said material being present in said container in the event said output signal exceeds said threshold.

5. A system to detect the presence of radiation shielding material in a shipping container comprising:
   a container crane assembly operable to lift said container;
   a radiation shielding detection device located on said container crane assembly operable to detect the presence of said material when proximal to said container; and
   a computer, said radiation shielding detection device developing an output signal communicated to said computer, said computer in response to said output signal comparing said output signal to a predetermined threshold to determine a status of said container.

6. The system of claim 5 wherein said container crane assembly includes a hoist attachment to engage said container, said radiation shielding detection device being mounted on said hoist attachment.

7. The system of claim 5 wherein said computer generates a certificate verifying that said container does not contain a quantity of said material greater than a predetermined maximum quantity the event said output signal is less than said threshold.

8. The system of claim 5 wherein said computer develops an output signal indicative of said material being present in said container in the event said output signal exceeds said threshold.

9. A system to detect the presence of at least one of fissile or radioactive material and radiation shielding material in a shipping container comprising:
   a container crane assembly operable to lift said container; and
   a fissile or radioactive material detection device and a radiation shielding detection device located on said container crane assembly respectively operable to detect the presence of said fissile or radioactive material and said radiation shielding material when proximal to said container; and
   a computer, said fissile or radioactive material detection device and said radiation shielding detection device each developing an output signal communicated to said computer, said computer in response to said output signal from each of said radioactive material detection device and said radiation shielding detection device comparing said output signal from said fissile or radioactive material detection device to a preset radiation tolerance threshold and comparing said output signal from said radiation shielding detection device to a preset radiation shielding tolerance threshold to determine a status of said container.

10. The system of claim 9 wherein said container crane assembly includes a hoist attached to engage said container, said fissile or radioactive material device and said radiation shielding detection device being mounted on said hoist attachment.

11. The system of claim 9 wherein said computer generates a certificate verifying that said container does not contain a quantity of said fissile or radioactive material and a quantity of said radiation shielding material in a quantity greater than a respective predetermined maximum quantity in the event said output signal from said fissile or radioactive material detection device and said output signal from said radiation shielding detection device are each respectively less than said radiation tolerance threshold and said radiation shielding tolerance threshold.

12. The system of claim 9 wherein said computer develops an output signal indicative of either of said fissile or radioactive material and said radiation shielding material being present in said container in the event said output signal from either of said fissile or radioactive material detection device and said output signal from said radiation shielding detection device respectively exceeds a respective one of said radiation tolerance threshold and said radiation shielding tolerance threshold.

13. A method for detection of the presence of fissile or radioactive material within a shipping container comprising steps of:
   positioning a fissile or radioactive material detection device in a fixed spatial relationship to a shipping container during the handling thereof by a container crane assembly; and
   comparing an output signal of said detection device to a predetermined threshold to determine a status of said container.

14. A method as set forth in claim 13 further comprising the step of developing an alarm signal in the event said output signal exceeds said threshold.

15. A method as set forth in claim 13 further comprising the step of issuing a certificate verifying that said container does not contain a quantity of said material greater than a predetermined maximum quantity in the event said output signal is less than said threshold.

16. A method as set forth in claim 13 wherein said positioning step includes the step of mounting said detection device to a hoist attachment of a said container crane assembly.

17. A method as set forth in claim 13 further comprising the step of calculating said threshold based on information contained in a manifest listing the cargo expected to be in said container.

18. A method for detection of the presence of radiation shielding material within a shipping container comprising steps of:
   positioning a radiation shielding material detection device in a fixed spatial relationship to a shipping container during the handling thereof by a container crane assembly; and
   comparing an output signal of said detection device to a predetermined threshold to determine a status of said container.

19. A method as set forth in claim 18 further comprising the step of developing an alarm signal in the event said output signal exceeds said threshold.

20. A method as set forth in claim 18 further comprising the step of issuing a certificate verifying that said container does not contain a quantity of said material greater than a predetermined maximum quantity in the event said output signal is less than said threshold.

21. A method as set forth in claim 18 wherein said positioning step includes the step of mounting said detection device to a hoist attachment of a said container cane assembly.

22. A method as set forth in claim 18 further comprising the step of calculating said threshold based on information contained in a manifest listing the cargo expected to be in said container.

23. A method for detection of the presence of at least one of fissile or radioactive material and radiation shielding material within a shipping container comprising steps of:
   positioning a fissile or radioactive material detection device and a radiation shielding material detection device in a fixed spatial relationship to a shipping container during the handling thereof by a container crane assembly; and
   comparing an output signal of said fissile or radioactive material detection device to a predetermined radiation tolerance threshold and comparing an output signal of said shielding material detection device to a predetermined radiation shielding tolerance threshold to determine a status of said container.

24. A method as set forth in claim 23 further comprising the step of developing an alarm signal in the event either one of said output of said fissile or radioactive material detection device and said output signal of said shielding material detection device respectively exceeds said radiation tolerance threshold and said radiation shielding tolerance threshold.

25. A method as set forth in claim 23 further comprising the step of issuing a certificate verifying that said container does not contain a quantity of said fissile or radioactive material and a quantity of said radiation shielding material in a quantity greater than a respective predetermined maximum quantity in the event said output signal of said fissile or radioactive material detection device is less than said radiation tolerance threshold and said output signal of said radiation shielding material detection device is less than said radiation shielding tolerance threshold.

26. A method as set forth in claim 23 wherein said positioning step includes the step of mounting said detection devices to a hoist attachment of said container crane assembly.

27. A method as set forth in claim 23 further comprising the step of calculating said radiation tolerance threshold and said radiation shielding tolerance threshold based on information contained in a manifest listing the cargo expected to be in said container.

28. A system to determine the gamma ray spectrum of gamma ray emitting material in a shipping container comprising:
   a container crane assembly operable to lift said container; and
   a gamma ray spectrum determining device located on said container crane assembly operable to determine the gamma ray spectrum of said material when proximal to said container; and
   a computer, said gamma ray spectrum determining device developing an output signal communicated to said computer, said computer in response to said output signal comparing said output signal to a predetermined threshold to determine a status of said container.

29. The system of claim 28 wherein said container crane assembly includes a hoist attachment to engage said container, said gamma ray spectrum determining device being mounted on said hoist attachment.

30. The system of claim 28 wherein said computer generates a certificate verifying that said container does not contain a quantity of said gamma ray emitting material greater than a predetermined maximum quantity in the event said output signal is less than said threshold.

31. The system of claim 28 wherein said computer develops an output signal indicative of said material being present in said container in the event said output signal exceeds said threshold.

32. A system to detect neutron emitting material in a shipping container comprising:
   a container crane assembly operable to lift said container; and
   a neutron emitting material detection device located on said container crane assembly operable to detect the presence of said material when proximal to said container; and
   a computer, said neutron emitting material detection device developing an output signal communicated to said computer, said computer in response to said output signal comparing said output signal to a predetermined threshold to determine a status of said container.

33. The system of claim 32 wherein said container crane assembly includes a hoist attachment to engage said container, said neutron emitting material detection device being mounted on said hoist attachment.

34. The system of claim 32 wherein said computer generates a certificate verifying that said container does not contain a quantity of said neutron emitting material greater than a predetermined maximum quantity in the event said output signal is less than said threshold.

35. The system of claim 32 wherein said computer develops an output signal indicative of said material being present in said container in the event said output signal exceeds said threshold.

36. A system to identify a radionuclide in a shipping container comprising:
   a container crane assembly operable to lift said container; and
   a radionuclide identification device located on said container crane assembly operable to detect the presence of said radionuclide when proximal to said container; and
   a computer, said radionuclide identification device developing an output signal communicated to said computer, said computer in response to said output signal comparing said output signal to a predetermined threshold to determine a status of said container.

37. The system of claim 36 wherein said container crane assembly includes a hoist attachment to engage said container, said radionuclide identification device being mounted on said hoist attachment.

38. The system of claim 36 wherein said computer generates a certificate verifying that said container does not contain a quantity of said radionuclide greater than a predetermined maximum quantity in the event said output signal is less than said threshold.

39. The system of claim 36 wherein said computer develops an output signal indicative of said radionuclide being present in said container in the event said output signal exceeds said threshold.

40. A method for determining the gamma ray spectrum of gamma ray emitting material within a shipping container comprising steps of:
positioning a gamma ray spectrum determining device in a fixed spatial relationship to a shipping container during the handling thereof by a container crane assembly; and
comparing an output signal of said determining device to a predetermined threshold to determine a status of said container.

41. A method as set forth in claim 40 further comprising the step of developing an alarm signal in the event said output signal exceeds said threshold.

42. A method as set forth in claim 40 further comprising the step of issuing a certificate verifying that said container does not contain a quantity of said material greater than a predetermined maximum quantity in the event said output signal is less than said threshold.

43. A method as set forth in claim 40 wherein said positioning step includes the step of mounting said determining device to a hoist attachment of said container crane assembly.

44. A method as set forth in claim 40 further comprising the step of calculating said threshold based on information contained in a manifest listing the cargo expected to be in said container.

45. A method for detection of the presence of neutron emitting material within a shipping container comprising steps of:
positioning a neutron emitting material detection device in a fixed spatial relationship to a shipping container during the handling thereof by a container crane assembly; and
comparing an output signal of said detection device to a predetermined threshold to determine a status of said container.

46. A method as set forth in claim 45 further comprising the step of developing an alarm signal in the event said output signal exceeds said threshold.

47. A method as set forth in claim 45 further comprising the step of issuing a certificate verifying that said container does not contain a quantity of said material greater than a predetermined maximum quantity in the event said output signal is less than said threshold.

48. A method as set forth in claim 45 wherein said positioning step includes the step of mounting said detection device to a hoist attachment of said container crane assembly.

49. A method as set forth in claim 45 further comprising the step of calculating said threshold based on information contained in a manifest listing the cargo expected to be in said container.

50. A method for identifying a radionuclide in a shipping container comprising steps of:
positioning a radionuclide identification device in a fixed spatial relationship to a shipping container during the handling thereof by a container crane assembly; and
comparing an output signal of said identification device to a predetermined threshold to determine a status of said container.

51. A method as set forth in claim 50 further comprising the step of developing an alarm signal in the event said output signal exceeds said threshold.

52. A method as set forth in claim 50 further comprising the step of issuing a certificate verifying that said container does not contain a quantity of said radionuclide greater than a predetermined maximum quantity in the event said output signal is less than said threshold.

53. A method as set forth in claim 50 wherein said positioning step includes the step of mounting said identification device to a hoist attachment of said container crane assembly.

54. A method as set forth in claim 50 further comprising the step of calculating said threshold based on information contained in a manifest listing the cargo expected to be in said container.

55. A method for identifying a point source of fissile or radioactive material in a shipping container comprising steps of:
positioning a plurality of fissile or radioactive material detection devices distributed in a fixed spatial relationship to a shipping container during the handling thereof by a container crane assembly wherein each of said detection devices develops an output signal; and
comparing differential output signals developed from said output signal from each of said detection devices to a predetermined threshold to determine a status of said container.

56. A method as set forth in claim 55 further comprising the step of developing an alarm signal in the event one of said differential output exceeds said threshold to indicate the presence of a point source of said material.

57. A method as set forth in claim 55 wherein said positioning step includes the step of mounting said devices to a hoist attachment of said container crane assembly.

58. A method as set forth in claim 55 further comprising the step of calculating said threshold based on information contained in a manifest listing the cargo expected to be in said container.

* * * * *